(12) United States Patent
Kalberer et al.

(10) Patent No.: US 10,466,670 B2
(45) Date of Patent: Nov. 5, 2019

(54) FIELD BUS MODULE, MACHINE CONTROLLER, AND METHOD FOR PARAMETERIZING A FIELD BUS MODULE, IN PARTICULAR A SAFETY-ORIENTED FIELD BUS MODULE

(71) Applicant: FESTO AG & Co. KG, Esslingen (DE)

(72) Inventors: Roland Kalberer, Kirchheim (DE); Martin Hommel, Loenberg (DE); Colin Leitner, Wendlingen (DE); Martin Gehrke, Weinstadt (DE); Martin Maier, Ostifildern (DE)

(73) Assignee: Festo AG & Co., KG, Esslingen (DE)

( * ) Notice: Subject to any disclaimer, the term of this patent is extended or adjusted under 35 U.S.C. 154(b) by 92 days.

(21) Appl. No.: 15/115,443

(22) PCT Filed: Feb. 3, 2015

(86) PCT No.: PCT/EP2015/000210
§ 371 (c)(1),
(2) Date: Jul. 29, 2016

(87) PCT Pub. No.: WO2015/117749
PCT Pub. Date: Aug. 13, 2015

(65) Prior Publication Data
US 2017/0185059 A1 Jun. 29, 2017

(30) Foreign Application Priority Data
Feb. 5, 2014 (DE) .......................... 10 2014 001 462

(51) Int. Cl.
*G05B 19/04* (2006.01)
*G05B 19/042* (2006.01)
(Continued)

(52) U.S. Cl.
CPC .......... *G05B 19/0425* (2013.01); *G05B 9/02* (2013.01); *G05B 19/0426* (2013.01);
(Continued)

(58) Field of Classification Search
CPC ............ G05B 19/4185; G05B 19/4183; G05B 19/0426; G05B 19/054; G05B 19/0425; G05B 9/02; Y02P 90/18
See application file for complete search history.

(56) References Cited

U.S. PATENT DOCUMENTS

2003/0061293 A1* 3/2003 Steindl ............... G05B 19/4185
709/208
2005/0114577 A1* 5/2005 Beckhoff ............. G05B 19/042
710/110

(Continued)

FOREIGN PATENT DOCUMENTS

DE 60018209 1/2006
DE 102007024687 1/2009

(Continued)

*Primary Examiner* — Tuan C Dao
(74) *Attorney, Agent, or Firm* — Hoffmann & Baron, LLP (57) ABSTRACT

A field bus module for the operation of actuators and/or sensors with at least one device interface for the connection of a sensor and/or actuator, with at least one field bus interface for connection to a field bus system, and with a processing device for receiving and processing and sending field bus telegrams and also for making available control commands, especially safety-oriented control commands, to the device interface depending on incoming field bus telegrams wherein the processing device is configured to process in different operating modes sensor data that can be made available at the device interface and/or field bus telegrams that can be made available at the field bus interface, wherein an operating mode memory is allocated to the processing device for the optional provision of one of at least (Continued)

two different operating mode data sets at the processing device depending on an incoming field bus telegram.

11 Claims, 2 Drawing Sheets

(51) Int. Cl.
    *G05B 9/02*           (2006.01)
    *G05B 19/05*         (2006.01)
    *G05B 19/418*       (2006.01)
    *H04L 12/64*        (2006.01)

(52) U.S. Cl.
    CPC ....... *G05B 19/0428* (2013.01); *G05B 19/054* (2013.01); *G05B 19/4183* (2013.01); *G05B 19/4185* (2013.01); *H04L 12/6418* (2013.01); *G05B 19/418* (2013.01); *G05B 2219/25428* (2013.01); *G05B 2219/31211* (2013.01); *Y02P 90/18* (2015.11)

(56) References Cited

U.S. PATENT DOCUMENTS

| | | | | |
|---|---|---|---|---|
| 2007/0243830 A1* | 10/2007 | Isenmann | ........... | H04L 12/4625 455/67.11 |
| 2009/0276180 A1* | 11/2009 | Schneider | .............. | G01B 21/22 702/151 |
| 2011/0279231 A1* | 11/2011 | Schwenkel | ........ | G05B 19/4186 340/9.1 |
| 2012/0235479 A1* | 9/2012 | Seiler | ................... | G05B 19/042 307/11 |
| 2013/0035924 A1* | 2/2013 | Hoeh | .................... | G06F 13/105 703/22 |
| 2014/0358303 A1* | 12/2014 | Leonard | ................ | F15B 19/005 700/283 |

FOREIGN PATENT DOCUMENTS

| | | |
|---|---|---|
| DE | 102008012104 | 9/2009 |
| DE | 102008053557 | 9/2009 |
| DE | 102009046934 | 5/2011 |
| DE | 102009054800 | 6/2011 |

\* cited by examiner

FIELD BUS MODULE, MACHINE CONTROLLER, AND METHOD FOR PARAMETERIZING A FIELD BUS MODULE, IN PARTICULAR A SAFETY-ORIENTED FIELD BUS MODULE

This application claims priority based on an International Application filed under the Patent Cooperation Treaty, PCT/EP2015/000210, filed Feb. 3, 2015, which claims priority to DE102014001462.2, filed Feb. 5, 2014.

BACKGROUND OF THE INVENTION

The invention relates to a field bus module for the operation, in particular safety-oriented operation, of actuators and/or sensors, a machine controller for controlling an apparatus, as well as a method for the parameterisation of a field bus module, in particular a safety-oriented field bus module.

From DE 10 2008 012 104 A1 a method is known for setting up control and/or regulating devices, wherein by means of at least one device description file information is read into and/or uploaded to at least one control/regulating device, the uploaded information is analysed on program coding means executable for the at least one control and/or regulating device, executable program coding means are recognised as such and interpreted and/or executed, and wherein at least one functionality and/or configuration of at least one control/regulating device that can be predetermined according to requirements is imposed and the respective control/regulating device is set up and/or configured as appropriate.

SUMMARY OF THE INVENTION

The object of the invention consists in providing a field bus module, a machine controller as well as a method for the parameterisation of a field bus module, in particular a safety-oriented field bus module, in which a simple parameterisation of the field bus module is made possible independently of the employed field bus system.

This object is achieved according to a first aspect for a field bus module of the type mentioned in the introduction comprising: at least one device interface for connection of a sensor and/or actuator, at least one field bus interface for connection to a field bus system, and a processing device for receiving and processing and sending field bus telegrams, in particular safety-oriented telegrams, and also for making available control commands, especially safety-oriented control commands, at the device interface depending on incoming field bus telegrams, in particular safety-oriented telegrams, wherein the processing device is configured to process in different operating modes sensor data that can be made available at the device interface and/or field bus telegrams that can be made available at the field bus interface, wherein an operating mode memory is allocated to the processing device for the optional provision of one of at least two different operating mode data sets at the processing device depending on an incoming field bus telegram, in particular a safety-oriented telegram.

The field bus module can for example be an input module that is configured for the coupling of at least one sensor and processes sensor signals of this sensor that are made available at the device interface. The processed sensor signals are made available by the processing device preferably in the form of a field bus telegram, in particular a safety-oriented telegram, at the field bus interface in order to allow a transmission via a field bus system to in particular a control device, in particular a safety-oriented control device. Alternatively the field bus module can be configured as an output module for operating at least one actuator, which can be connected to the device interface. For this, the processing device is configured so as to evaluate, via the field bus interface, incoming field bus telegrams, in particular safety-oriented telegrams, and to process control signals, in particular safety-oriented signals, contained in the field bus telegrams into control commands for the connected actuator. These control commands are passed on from the processing device to the device interface to control the actuator. Alternatively the field bus module can be configured as a combination of an input module and an output module, such a combination usually also being termed an "E/A module". In such an E/A module there is normally provided a bidirectional, in particular safety-oriented, communication via the field bus interface and a field bus system connected thereto, to a control device, in particular a safety-oriented control device.

The processing device of the field bus module is preferably a microprocessor or microcontroller that is configured to receive, process and send field bus telegrams, in particular safety-oriented telegrams, and to provide control commands, in particular safety-oriented control commands, at the device interface. Control commands are understood to be in particular electrical signals that serve to initiate movements of actuators or to activate and/or check and/or select sensors. The control commands may in particular be continuous or time-variable electrical voltages and/or currents.

The field bus module according to the invention can process the sensor data and/or the field bus telegrams in different operating modes, in particular depending on the sensors and/or actuators that are connected to the device interface, and which may have different properties. For example a processing of signals of an emergency stop switch connected as sensor at the device interface requires a different signal processing to that a temperature sensor or rpm sensor connected as sensor at the device interface. With the regard to the processing of field bus telegrams the type of actuator that is connected to the device interface may also be important, in order on the basis of an information content of the field bus telegrams to make available at the device interface a control command adapted to the respective actuator. Accordingly the processing device is configured so that it can be operated in different operating modes. The determination of the exactly one operating mode to be executed in each case is made on the basis of an operating mode signal contained in the user data area of the incoming, in particular safety-oriented, field bus telegram, and by selecting the exactly one operating mode data set determined in each case by the operating mode signal, from the operating mode memory, which is made available at the processing device. By selecting the operating mode on the basis of the incoming field bus telegram, in particular safety-oriented telegram, a different parameterisation of the field bus module, in particular via a separate parameterisation interface with the aid of a separate parameterisation device or a field bus-based parameterisation of the field bus module in a special parameterisation operating state (off-line state), can be dispensed with. Instead, the parameterisation of the field bus module is effected by the use of at least one part of the freely selectable user data of the normal, in particular safety-oriented, field bus telegrams in the respective field bus system, without the necessity for additional measures for this purpose at the control unit, at a programming device for the control unit, or at the field bus system. This type of parameterisation is useful in particular in safety-oriented field bus modules that are not configured for a parameterisation in the context of a standard parameterisation procedure predetermined by the manufacturer of the primary control unit, in particular a parameterisation procedure with acyclic data transfer. For example, third-party manufacturers of field bus module do not have simple handy access to the data formats used in the standard parameterisation procedure by the control unit, so that the parameterisation procedure of the master control unit is not utilised for such field bus modules. In order however to enable a parameterisation of such field bus modules, in particular safety-oriented modules, of third-party manufacturers via the master control unit and its programming device, the field bus module according to the invention makes use of the field bus telegrams, in particular safety-oriented telegrams, that are preferably cyclically made available by the control unit to the field bus module.

Advantageous developments of the invention are disclosed in the sub-claims.

In this connection it is advantageous if the processing device is configured for the processing of exactly one operating mode data set of a plurality of different operating mode data sets that are stored in the operating mode memory. A selection of the operating mode data set from the operating mode memory for use in the processing device is made by information contained in the user data of the field bus telegram, which information is for example a binary code with an information depth of one or more bits. In this way for example in the case of an information depth of 3 bits, a selection can be made from a relatively large number of stored operating mode data sets, in particular from 8 operating mode data sets, of that operating mode data set that is required for the respective application of the field bus module. Preferably it is envisaged that the operating mode data sets are already stored in the operating mode memory during the production of the field bus module, so that a user of the field bus module in the case of a use in a machine controller simply has to select the matching operating mode data set in order to be able to bring the field bus module into operation in the respective environment.

It is therefore expedient if the processing device for selecting an operating mode signal is configured from a user data area of the, in particular safety-oriented, field bus telegram. According to the invention the operating mode signal is contained in the user data area of the field bus telegram, in particular safety-oriented telegram, so that a field bus telegram for the field bus module according to the invention does not differ from other, in particular safety-oriented, field bus telegrams for other, in particular safety-oriented field bus telegrams, that do not allow a parameterisation in accordance with the parameterisation method according to the invention. Preferably the operating signal transmitted in the user data area of the field bus telegram, in particular safety-oriented telegram, is simply a coding for a desired operating mode. The desired operating mode is after selecting the operating mode from the user data area of the field bus telegram, in particular safety-oriented telegram, decoded in the processing device with the aid of the operating mode memory, in order to be able to make available to the processing device the information in the form of the operating mode data set from the operating mode memory that is necessary for executing the desired operating mode in each case. Preferably the operating mode signal includes only a small amount of data, so that the user data area of the field bus telegram, in particular safety-oriented telegram, can be used at least substantially for the transmission of control signals for the sensors and/or actuators connected to the device interface.

Preferably it is envisaged that the operating mode signal is executed as a data word with four or eight or sixteen bits. Depending on the number of the operating mode data sets to be accessed from the operating mode memory, a variable length of the data word for the operating mode signal can however also be selected. Preferably it is envisaged that the processing device comprises a first data processing area in which a processing of the incoming, in particular safety-oriented, field bus telegram takes place in accordance with a single, strictly prescribed processing procedure. In addition the processing device includes for example a second data processing area, in which an operating mode data set freely selectable from the operating mode memory can be used for the processing of user data from the, in particular safety-oriented, field bus telegram, and/or of sensor data of the sensors connected to the device interface.

It is advantageous if the operating mode memory and/or the processing device includes an enabling means for making available an operating mode data set from the operating mode memory to the processing device and/or for enabling a processing procedure by the processing device depending on the operating mode signal contained in the, in particular safety-oriented, field bus telegram. The enabling means is therefore responsible for permitting a change of the operating mode for the processing device by making available the desired operating mode data set from the operating mode memory to the processing device, or for releasing in a one-off or time-limited manner an operating mode data set already made available to the processing device for a processing of user data of the, in particular safety-oriented, field bus telegram, and/or sensor data, in particular with each newly arriving field bus telegram, in particular safety-oriented telegram.

Preferably the enabling means is arranged so as to allow, on arrival of the in particular safety-oriented field bus telegram, in each case a one-off provision of the desired operating mode data set to the processing device, and also to implement only once the processing of the in particular safety-oriented control signals that arrived with the same, in particular safety-oriented, field bus telegram into control commands for the attached actuator.

Alternatively the enabling means can be arranged so as to maintain over a predeterminable duration the release of the operating mode for the processing device and the processing procedure taking place there. Preferably the predetermined duration corresponds to a multiple of a cycle time, in particular to three cycle times, for a cyclical arrival of field bus telegram, in particular safety-oriented telegram, at the field bus module. In this way it is ensured that an operating mode selected by the in each case preceding field bus telegram, in particular safety-oriented telegram, does not have to be maintained for an arbitrarily long time. Rather, at the latest after expiry of the predetermined duration no further processing of user data or sensor data should take place any more, and processing should be allowed again only if a new, in particular safety related, field bus telegram arrives at the field bus module, with which the same or a new operating mode is specified and possibly new control signals arrive. By means of these measures a memory, in particular a safety-oriented memory, for the intermediate storage of the operating mode signal can be dispensed with, which provides an additional security advantage since by dispensing with such a memory a continuous monitoring of the memory is no longer necessary. Undesired changes of the operating mode can thus occur at most within the time span within which the validity of the operating mode is confirmed by the enabling means.

In an alternative embodiment a storage medium for the operating mode signal selected from the field bus telegram, in particular safety-oriented telegram, is allocated to the processing device. In this embodiment the storage medium must additionally be provided, and furthermore a check of the contents stored in the storage medium must correspond to the security requirements of the security level according to which the field bus module is classified. It is advantageous in this connection however that the operating mode signal can also be kept for relatively long periods of time in the field bus module without the need for additional data band width for the transmission of the operating mode signal in the user data area of the field bus telegram, in particular safety related telegram, via the field bus system.

In a further modification of the invention it is envisaged that the operating mode data sets for the processing device stored in the operating mode memory are in each case configured as a combination of a processing algorithm and at least one parameter for the processing algorithm. In this connection the processing algorithm is in each case adapted to the sensor or actuator connected to the device interface. As an example, similarly implemented sensors or similarly implemented actuators can of course in principle be controlled with the same processing algorithm in each case, though different parameters are required. The combination of the processing algorithm necessary in each case and the parameter required for the specific actuator or sensor is summarised in the respective operating mode data set, stored in the operating mode memory, and filed there with an identifier. This identifier is matched to the operating mode signal that can be made available via the field bus telegram, in particular safety-oriented telegram.

The field bus module according to the invention can be used as a component of a machine controller. The machine controller includes a master control unit, which comprises a control device, in particular safety-oriented device, and which during a continuous operation of the apparatus to be controlled is configured so as to make available at least to some extent field bus telegrams, in particular safety-oriented telegrams, to a field bus system, with a field bus system for transmitting field bus telegrams and with at least one field bus module according to the invention connected to the field bus system.

With such a machine controller industrial robots, chemical or biological reactors, power stations or processing machinery for example can be controlled. By the use of at least one field bus module according to the invention within the machine controller a parameterisation of this field bus module can be carried out by means of a programming device provided for the control unit or the control device, in particular in continuous operation of the apparatus to be controlled. This is possible since the information necessary for the parameterisation can be transmitted via a conventional, in particular safety-oriented field bus telegram, from the control device, in particular safety-oriented control device, to the field bus module, in particular safety-oriented field bus module. This is especially useful if during the continuous operation of the apparatus sensors for example, in particular safety-oriented sensors, are to be replaced, and no decommissioning or only a partial decommissioning of the apparatus is required for this purpose. Accordingly with a recommissioning of these plant parts a complete restarting of the whole apparatus, as may be necessary in the prior art, is avoided. Normally an access to safety-oriented and non-safety-oriented field bus modules during the continuous operation of the apparatus is possible in any case with a software specifically adapted to the control unit, which however is not configured for an input and transmission of individual operating modes or adjustment parameters for the respective field bus module.

Since however the field bus module according to the invention can be parameterised by an operating mode signal contained in a user data area of the field bus telegram, in particular safety-oriented telegram, and thus can be influenced in its operating mode that is to be executed, in order to carry out a parameterisation a user simply has to modify the, in particular safety-oriented, field bus telegram for the attached field bus module, and can thereby, especially during the operation of the plant, adjust the operating mode for this field bus module without having to exert for this purpose an influence on other plant parts.

The object of the invention is achieved according to a second aspect by a method for the parameterisation of a field bus module, in particular safety-oriented field bus module, which is connected via a field bus system to a master control unit, which includes a control device, in particular safety-oriented device, wherein the following steps are envisaged: making available a field bus telegram, in particular safety-oriented telegram, from the control device, in particular safety-oriented control device, via the field bus system to the field bus module, processing of the field bus telegram, in particular safety-oriented telegram, in a processing device of the field bus module in order to select user data from a user data area of the field bus telegram, in particular safety-oriented telegram, making available an operating mode signal contained in the user data to an operating mode memory associated with the processing unit, in which a plurality of operating mode data sets for the processing device are stored, selection of the operating mode corresponding to the provided operating mode signal, and making available the selected operating mode from the operating mode memory to the processing device, processing of further user data contained in the user data area of the field bus telegram, in particular safety-oriented telegram, for making available control commands, in particular safety-oriented commands, to a device interface of the field bus module and/or processing of sensor data that are made available at a device interface to produce a field bus telegram, in particular safety-oriented telegram, for onward transmission to a field bus interface of the field bus module.

In a development of the method it is envisaged that the user data of the field bus telegrams, in particular safety-oriented telegrams, that are made available by the control device, in particular safety-oriented device, via the field bus system to the field bus module in particular during a continuous operation of an apparatus to be controlled by the control unit contain a cyclically recurring, in particular always or constantly or in each case, operating mode signal.

In a further development of the method it is envisaged that the operating mode signal contained in the user data determines the operating mode data set, which is configured as as a tested combination of a processing algorithm and at least one parameter for the processing algorithm, especially by using safety-oriented aspects, and that the processing device carries out the processing of further user data from the field bus telegram, in particular safety-oriented telegram, and/or sensor data by means of the processing algorithm defined by the operating mode signal, with the inclusion of the at least one parameter.

In an advantageous modification of the method it is envisaged that several operating mode signals for several processing devices of the field bus module are contained in the user data and that the operating mode data sets for the processing devices are made available by means of the operating mode signals from a common operating mode memory to the respective processing device.

An advantageous embodiment of the invention is illustrated in the drawings, in which.

BRIEF DESCRIPTION OF THE DRAWINGS

DETAILED DESCRIPTION OF THE PREFERRED EMBODIMENTS

Figure 1:
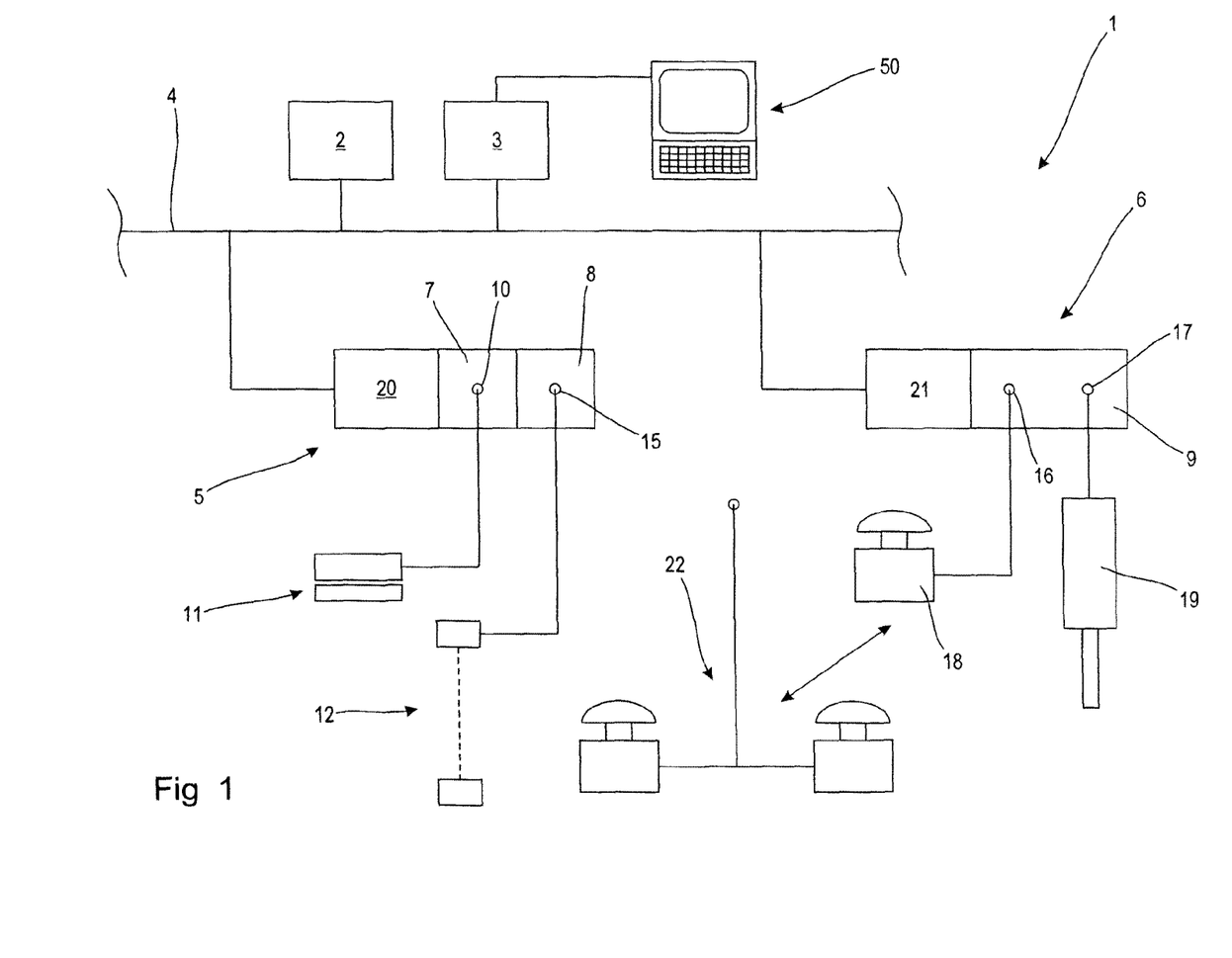
FIG. 1: shows a schematic representation of a machine controller for controlling an apparatus with a master control unit, which includes a control device, for example a safety-oriented configured control device, and also with a field bus system and a plurality of field bus modules.

A machine controller 1 schematically illustrated in FIG. 1 is provided for controlling an apparatus, not shown here in more detail, which may for example be a processing machine or a chemical or biological reactor. The machine controller 1 includes inter alia a master control unit 2, which may for example be a memory programmable control (SPS). In addition the machine controller includes for example a safety-oriented control device 3, in particular a safety-oriented memory programmable control (SSPS). For example it is envisaged that the control unit 2 and the control device 3 are in each case connected via an electrically communicating link to a field bus system 4. For an orderly data traffic by the field bus system 4, the control unit 2 and the control device 3 are configured so that furthermore be mutually matched as regards the times at which normal field bus telegrams are transmitted from the control unit 2 and the times at which safety-oriented field bus telegrams are transmitted from the control device 3 via the field bus system 4. The control unit 2, the control device 3 and the field bus system 4 are configured corresponding to a predetermined field bus protocol, in which this field bus permits in addition to the transmission of normal field bus telegrams and safety-oriented field bus telegrams in principle also the transmission of parameters to field bus participants 5, 6, in order to be able to adapt these in an advantageous manner to the tasks that have to be fulfilled by them.

Normally however the transmission of parameters to field bus participants is restricted to those field bus participants—not shown in FIG. 1—that are specifically configured according to the specifications of the manufacturer of the field bus protocol chosen in each case. On the other hand field bus participants 5, 6 that do not fully correspond to these manufacturer specifications cannot be addressed in a direct manner by the control unit 2 or the control device 3 via the field bus system 4. Rather, in the case of the field bus participants 5, 6 configured in this way it is necessary to address the field bus participants 5, 6 directly with a programming device in order to be able to transmit the desired parameters. Alternatively an additional configuration software is required, which for its part is adapted to a programming software for the programming device 50 for programming the control unit 2 and/or the control device 3, in order to be able to make the desired parameters available via the control unit 2 and/or the control device 3 and the field bus system 4 to the field bus participants 5, 6.

In order to allow a parameterisation of field bus participants 5, 6 that are not specified exactly according to the specifications of the manufacturer of the employed field bus protocol, via the control device 3, the field bus participants 5, 6 are for this purpose arranged so that they can be parameterised with the aid of the field bus telegrams made available during continuous operation by the control unit 2 and/or the control device 3. This procedure is useful in particular for the parameterisation of safety-oriented field bus modules 7, 8 and 9 that are for example constituents of the field bus participants 5 and/or 6.

For example the safety-oriented field bus module 7 that is associated with the field bus participant 5 is an input module whose single device interface 10 is electrically connected to a symbolically represented door contact switch. The safety-oriented field bus module 8 also associated with the field bus participant 5 is electrically connected via the device interface 15 to a light curtain 12 that is provided to monitor an access way to a hazardous area (not shown in more detail), and is likewise exclusively configured as an input module. The safety-oriented field bus module 9 associated with the field bus participant 6 is configured as an input/output module and has two device interfaces 16, 17. In this connection the first device interface 16 is electrically connected to a control button, while the second device interface 17 is electrically connected to an electrical drive 19.

By way of example it is envisaged that the field bus modules 7, 8 and/or 9 are in each case electrically coupled to a bus node 20 or 21, which in turn is electrically connected to the field bus system 4. The bus nodes 20, 21 are configured so as to receive normal field bus telegrams and safety-oriented field bus telegrams from the control unit 2 and the control device 3 via the field bus system 4, and in particular to make available safety-oriented field bus telegrams to the control device 3 via the field bus system 4. In addition the bus nodes 20, 21 are configured for communication with the attached field bus modules 7, 8 and 9, in particular by using an internal bus communication system or a multipolar arrangement. For example, it is assumed for the following discussion that the field bus modules 7, 8 and 9 are not fully adapted to the field bus protocol made available by the control unit 2 and the control unit 3, and therefore cannot be parameterised via the field bus system 4 in a manner as expected in principle by the field bus protocol. Rather, the field bus modules 7, 8 and 9 are in each case configured so as to evaluate safety-oriented field bus telegrams of the control device 8 made available by the respective bus node 20, 21 and to select from the user data area of these safety-oriented field bus telegrams operating mode signals, with the aid of which a suitable operating mode can be determined for the respective field bus modules 7, 8 or 9, without the necessity of a complicated direct parameterisation of the field bus participants 5, 6 for this purpose or an additional software for the configuration of the control unit 2 and/or the control device 3.

Rather, it may be envisaged to carry out, especially during the continuous operation of the machine controller 1, a parameterisation of the field bus modules 7, 8 and 9 by means of a programming software provided by the manufacturer of the control unit 2 and the control device 3, and that can run on a workplace computer serving as programming device 50 or on a mobile programming device. For this purpose it is preferably envisaged to exert influence on the safety-oriented field bus telegrams that are dispatched from the control unit 3 to the safety-oriented field bus modules 7, 8 and 9. Such an influence on the safety-oriented field bus telegrams can then be exerted for example if over a sufficient time span in addition no control is envisaged of those actuators 19 that are to be monitored either by the sensors associated with the field bus modules 7, 8 or 9 or that are controlled by the field bus modules 7, 8 or 9.

A change of the parameterisation for a field bus module 7, 8 or 9 may for example be necessary if a component associated with the field bus module 7, 8 or 9 is to be replaced by a new component with different properties. For example, a replacement of the one-hand control switch 18 by a two-hand control switch 22 is provided for in FIG. 1. Since this two-hand control switch 22 has to be monitored in a different way by the field bus module 9 than in the case of the control switch 18, a new parameterisation of the field bus module 9 must be provided for. This can be prepared in a rest state of the machine controller 1 and can also be executed during continuous operation of the machine controller 1. To this end, with the aid of the programming device 50 provided for the programming of the control device 3 and the programming software running on it influence is exerted on the safety-oriented field bus telegram to be made available by the control device 3 to the field bus module 9. Further details are given hereinafter with the aid of FIG. 2.

Figure 2:
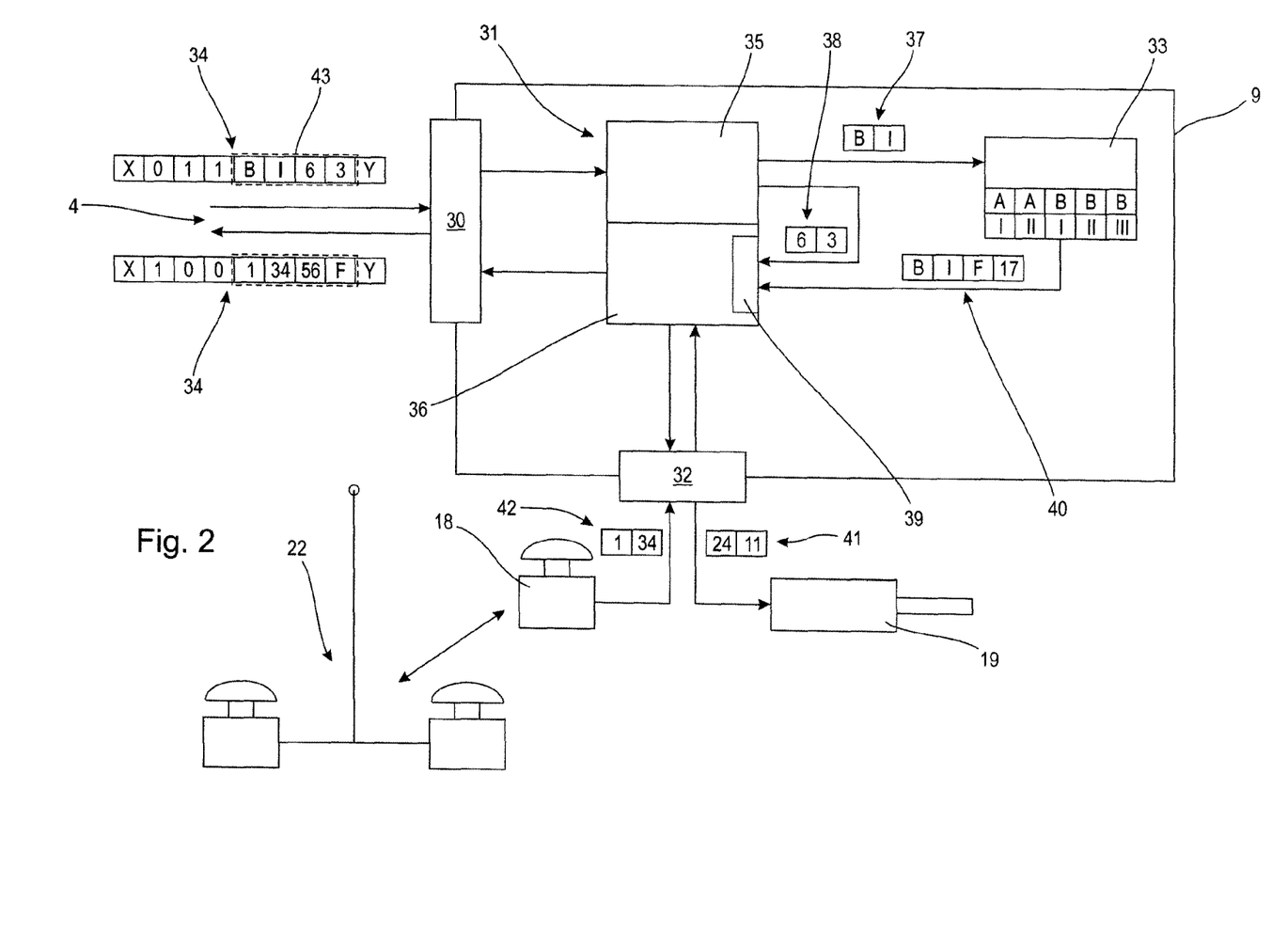
FIG. 2: shows a schematic representation of a field bus module for use in the machine controller according to FIG. 1.

A schematic construction of the field bus module 9 is illustrated in FIG. 2, in which the individual function blocks in the field bus module 9 do not necessarily have to be discrete components. Rather, it may be envisaged that these function blocks are optionally configured as hardware components or as software modules.

The field bus module 9 illustrated in FIG. 2 includes a field bus interface 30, a processing device 31, a device interface 32 as well as an operating mode memory 33. The field bus interface 30 is provided for a two-way communication with the field bus system 4, wherein hereinafter no distinction should be made as to whether the field bus interface 30 is in direct communication with the field bus system 4 or is connected to the field bus system 4 by the interposition of a bus node 21 (not illustrated). Incoming safety-oriented field bus telegrams 34 arriving at the field bus interface 30 are made available to the processing device 31. The processing device 31 can for example be subdivided into a first data processing area 35 and a second data processing area 36. In this case the first data processing area 35 serves for the processing of the incoming safety-oriented field bus telegrams 34 and is for example configured as non-alterable. On the other hand the second data processing area 36 is provided in the manner described in more detail hereinafter for the execution of different modes of operation and for example is configured to be alterable. A selection procedure of the user data area 43 of the arriving safety-oriented field bus telegram 34 takes place in the first data processing area 35. For this, the first data processing area 35 is configured so that it can select from the user data area 43 of the safety-oriented field bus telegram 34 on the one hand operating mode signals 37 and on the other hand control signals 38. Furthermore the first data processing area 35 is configured so as to pass on the selected operating mode signals 37 to the operating mode memory 33 and to pass on the selected control signals 38 to the second data processing area 36.

As an example it is envisaged that the second data processing area 36 has an enabling means 39, formed for example as a logic gate. The enabling means 39 is configured so that a processing of the control signals 38 is permitted in the data processing area 36 only on arrival of an operating mode data set made available by the operating mode memory 33 on the basis of the operating mode signal 37. For example, two different processing algorithms denoted by the letters A and B are stored in the operating mode memory 33, which in each case are allocated parameter sets identified by the Roman numerals I, II and I, II and III. Depending on the operating mode signal 37 that is made available at the operating mode memory 33, the selection of the desired operating mode data set takes place there—for example B-I, which is then made available as operating mode data set 40 to the second data processing area 36.

As has already been discussed hereinbefore, the enabling means 39 is associated with the second data processing area 36, which means can now on arrival of the operating mode data set 40 and with the existence of the already provided control signal 38 enable through the second data processing area 36 a processing of the control signal 38 according to the algorithm contained in the operating mode data set 40 and the associated parameter. In this way the enabling means 39 can prepare a safety-oriented control command 41 at the device interface 32 and for example at the electrical drive 19 connected to the device interface 32. This enabling means 39 can, as already mentioned in the introduction, be designed as a hardware component or as a software component. Alternatively it may be envisaged that simply through the internal structure of the processing device, in particular by dispensing with a related storage device, only a processing of user data and/or sensor signals is carried out if an operating mode data set is made available, and a new processing can only then take place if the respective data are made available once again to the processing device.

The use of a control switch 18 to activate or deactivate the electrical drive 19 is also provided for in the safety-oriented operating mode data set 40. For example, the processing device 31 with its second data processing area 36 monitors an arrival of test signals and switching signals that are made available by the processing device 31 or the control switch 18. For example, it is envisaged that the control switch 18 acknowledges in each case in predetermined time spans a test signal that is provided by the processing device 31. If there is no response to this test signal, the processing device 31 accordingly has to generate an error message corresponding to the algorithms provided in the operating mode data set 40, which is made available in the framework of a safety-oriented field bus telegram to the field bus interface 30 and from there via the field bus system 4 to the control device 3, not illustrated in FIG. 2. There a disconnection of partial areas of the apparatus or the whole apparatus may possibly be implemented.

In addition or alternatively it may be envisaged that on receipt of sensor data 42 in the form of a switching signal from the control switch 18 or in the absence of an acknowledgment of the test signal, an immediate disconnection of the electrical drive 19 is carried out with the aid of the algorithm running in the second data processing area 36, based on the operating mode data set 40.

In order as an example to adapt the processing device 31 to a two-hand control switch 22, which replaces a one-hand control switch 18, the following procedure is for example envisaged:

First of all the programming device 50 diagrammatically illustrated in FIG. 1, which may for example be a personal computer, is brought by a user into communication with the safety-oriented control device 3. A programming software that enables influence to be exerted on the procedures running in the safety-oriented control device 3 is installed on the programming device 50. In particular, with the aid of this programming software influence can be exerted on the safety-oriented field bus telegrams issued during the regular operation of the machine controller 1 by the control device 3 via the field bus system 4.

In order now to carry out the desired adaptation of the field bus participant 6 to the two-hand control switch 22, the user simply has to determine with the aid of documentation for the field bus participant 6 into which operating mode to bring the field bus module 9 of the field bus participant 6, in order to be able to communicate in the correct manner with the two-hand control switch 22. This information, which may for example be a data word with one byte, is predetermined via the programming software of the programming device 50 as the content of a, preferably cyclically recurring, safety-oriented field bus telegram to be sent for the field bus module 9.

For example it may be envisaged that the data word for the operating state of the field bus module 9 is contained with each information transmission by the control device 3 to the field bus module 9 in the safety-oriented field bus telegram.

Alternatively it may be envisaged that the data word for the operating state of the field bus module 9 is transmitted only at predetermined time intervals, for example with every second, third or fourth safety-oriented field bus telegram.

According to the predetermined or selectable transmission frequency for the data word, the control device 3 transmits with the safety-oriented field bus telegram for the field bus module 9 the information on the operating state for the field bus module 9 selected by the user.

As soon as the safety-oriented field bus telegram 34 according to FIG. 2 has arrived at the field bus interface 30, it is passed on to the processing device 31. There the evaluation of the user data area of the field bus telegram 34 takes place. For example, it is envisaged that an operating mode signal 37 as well as a control signal 31 are included in the user data area. First of all starting from the processing device 31 a transfer of the operating mode signal 37 to the operating mode memory 33 takes place. In the operating mode memory 33 the selection of the operating mode for the processing device 31 desired by the user then takes place by means of the content of the operating mode signal 37. The desired operating mode is made available in the form of the operating mode data set 40 at the second data processing area 36. This also already contains the control signal 38 likewise derived from the user data area 43 of the safety-oriented field bus telegram 34. After passing the enabling means 39 a processing of the control signal 38 can be carried out by means of the algorithm contained in the operating mode data set 40 and the associated parameters. In addition in the processing device 31 also the incoming signals of the two-hand control switch 22 connected to the device interface 32 can be processed by means of the algorithm contained in the operating mode data set 40 and the associated parameters. In this connection the algorithm contained in the operating mode data set 40 is for example configured in such a way that, instead of a single test signal to the hitherto used control switch 18, at least two test signals are sent to the two-hand control switch 22 and correspondingly also two acknowledgements are expected. In addition it may be envisaged that already in the absence of a response to these test signals ongoing measures are carried out in order to ensure the security level in the machine controller 1.

The advantage of the machine controller 1 according to the invention is the fact that no separate programming of the safety-oriented field bus modules 7, 8 or 9 by means of a programming device specifically tailored to these field bus modules 7, 8 or 9, or by a parameterisation software intervening in the programming software of the programming device 50, is necessary. Instead the user can by using the programming software that is in any case provided for the programming of the control unit 2 and the control device 3 predetermine in the programming device 50 the respective operating mode in the field bus modules 7, 8 and 9 by presetting the content for the safety-oriented field bus telegram at these field bus modules 7, 8 and 9. The field bus modules 7, 8 and 9 are according to the invention configured so as to extract the operating mode signal 37 from the safety-oriented field bus telegram structured in the normal way and to pass this on to the operating mode memory 33. From there the desired operating mode data set 40 can then be made available at the processing device 31, with which the processing of incoming sensor signals and/or control signals 38 made available via the safety-oriented field bus telegram 34 can take place within the second data processing area 36.

The invention claimed is:

1. A field bus module for the operation of sensors, comprising:
    at least one device interface for connection of a sensor;
    at least one field bus interface for connection to a field bus system; and
    a processing device for receiving and processing and sending field bus telegrams, and also for providing control commands to the device interface depending on incoming field bus telegrams,
    wherein the processing device is configured to process sensor data provided by the sensor at the device interface in different operating modes,
    wherein an operating mode memory is allocated to the processing device for the provision of one of at least two different operating mode data sets for the processing device depending on an incoming field bus telegram, and
    wherein the processing device is configured to process the sensor data based on the one of the at least two different operating mode data sets, wherein each of the operating mode data sets is configured as a tested combination of a processing algorithm and at least one parameter for the processing algorithm, wherein the one operating mode data set is determined by an operating mode signal contained in a user data area of the field bus telegram, and
    wherein each of the different operating modes depends on the sensor that is connected to the device interface, and
    wherein the processing device is further configured for selecting an operating mode signal from a user data area of the field bus telegram, and
    wherein at least one of the operating mode memory and the processing device includes a logic gate for making available an operating mode data set from the operating mode memory to the processing device and for enabling a processing procedure by the processing device depending on the operating mode signal contained in the field bus telegram, the logic gate being configured to maintain the release of the operating mode to the processing device over a predetermined duration and to terminate processing of the user data and the sensor data after expiry of the predetermined duration.

2. The field bus module according to claim 1, wherein the processing device is configured for processing exactly one operating mode data set from a plurality of different operating mode data sets that are stored in the operating mode memory.

3. The field bus module according to claim 1, wherein a storage medium for the operating mode signal selected from the field bus telegram is associated with the processing device.

4. The field bus module according to claim 1, wherein the operating mode data sets for the processing device stored in the operating mode memory are in each case configured as a combination of a processing algorithm and at least one parameter for the processing algorithm.

5. A method for the parameterisation of a field bus module that is connected via a field bus system to a master control unit, which includes a control device, the method comprising the steps:
providing a field bus telegram from the control device via the field bus system to the field bus module;
processing of the field bus telegram in a processing device of the field bus module in order to select user data from a user data area of the field bus telegram;
providing an operating mode signal contained in the user data to an operating mode memory associated with the processing unit, in which a plurality of operating mode data sets for the processing device are stored;
selection of an operating mode corresponding to the provided operating mode signal;
providing the selected operating mode from the operating mode memory to the processing device;
processing of sensor data provided by a sensor at a device interface of the field bus module to produce a field bus telegram for onward transmission to a field bus interface of the field bus module,
wherein the operating mode signal contained in the user data determines the selection of the operating mode from the plurality of operating mode data sets, wherein each of the operating mode data sets is configured as a tested combination of a processing algorithm and at least one parameter for the processing algorithm, and wherein the processing device carries out the processing of the sensor data with the aid of the processing algorithm determined by the operating mode, with the incorporation of the at least one parameter, and
wherein the operating mode depends on the sensor that is connected to the device interface, and
wherein the processing device is further configured for selecting an operating mode signal from a user data area of the field bus telegram, and
wherein at least one of the operating mode memory and the processing device includes a logic gate for making available an operating mode data set from the operating mode memory to the processing device and for enabling a processing procedure by the processing device depending on the operating mode signal contained in the field bus telegram, the logic gate being configured to maintain the release of the operating mode to the processing device over a predetermined duration and to terminate processing of the user data and the sensor data after expiry of the predetermined duration.

6. The method according to claim 5, wherein a cyclically recurring operating mode signal is contained in the user data of the field bus telegrams that are made available by the control device via the field bus system to the field bus module.

7. The method according to claim 5, wherein several operating mode signals for several processing devices of the field bus module are contained in the user data, and that the operating mode data sets for the processing devices are made available with the aid of the processing signals from a common operating mode memory to the respective processing device.

8. A field bus module for the operation of actuators comprising:
at least one device interface for connection of an actuator;
at least one field bus interface for connection to a field bus system; and
a processing device for receiving and processing and sending field bus telegrams, and also for providing control commands to the device interface depending on incoming field bus telegrams,
wherein the processing device is configured to process the field bus telegrams provided at the field bus interface in different operating modes,
wherein an operating mode memory is allocated to the processing device for the provision of one of at least two different operating mode data sets for the processing device depending on an incoming field bus telegram, and
wherein the processing device is configured to process user data from the field bus telegram based on the one of the at least two different operating mode data sets, wherein each of the operating mode data sets is configured as a tested combination of a processing algorithm and at least one parameter for the processing algorithm, wherein the one operating mode data set is determined by an operating mode signal contained in the user data of the field bus telegram, and
wherein each of the different operating modes depends on the actuator that is connected to the device interface, and
wherein the processing device is further configured for selecting an operating mode signal from a user data area of the field bus telegram, and
wherein at least one of the operating mode memory and the processing device includes a logic gate for making available an operating mode data set from the operating mode memory to the processing device and for enabling a processing procedure by the processing device depending on the operating mode signal contained in the field bus telegram, the logic gate being configured to maintain the release of the operating mode to the processing device over a predetermined duration and to terminate processing of the user data and the sensor data after expiry of the predetermined duration.

9. A field bus module for the operation of actuators and sensors, comprising:
at least one device interface for connection of a sensor and an actuator;
at least one field bus interface for connection to a field bus system; and
a processing device for receiving and processing and sending field bus telegrams, and also for providing control commands to the device interface depending on incoming field bus telegrams,
wherein the processing device is configured to process sensor data provided by the sensor at the device interface and field bus telegrams provided at the field bus interface in different operating modes,
wherein an operating mode memory is allocated to the processing device for the provision of one of at least two different operating mode data sets for the processing device depending on an incoming field bus telegram, and wherein the processing device is configured to process user data from the field bus telegram and to process sensor data based on the one of the at least two different operating mode data sets, wherein each of the operating mode data sets is configured as a tested combination of a processing algorithm and at least one parameter for the processing algorithm, wherein the one operating mode data set is determined by an operating mode signal contained in the user data of the field bus telegram, and wherein each of the different operating modes depends on at least one of the sensor that is connected to the device interface or the actuator that is connected to the device interface, and wherein the processing device is further configured for selecting an operating mode signal from a user data area of the field bus telegram, and wherein at least one of the operating mode memory and the processing device includes a logic gate for making available an operating mode data set from the operating mode memory to the processing device and for enabling a processing procedure by the processing device depending on the operating mode signal contained in the field bus telegram, the logic gate being configured to maintain the release of the operating mode to the processing device over a predetermined duration and to terminate processing of the user data and the sensor data after expiry of the predetermined duration.

10. A method for the parameterisation of a field bus module that is connected via a field bus system to a master control unit, which includes a control device, the method comprising the steps:

providing a field bus telegram from the control device via the field bus system to the field bus module;

processing of the field bus telegram in a processing device of the field bus module in order to select user data from a user data area of the field bus telegram;

providing an operating mode signal contained in the user data to an operating mode memory associated with the processing unit, in which a plurality of operating mode data sets for the processing device are stored;

selection of an operating mode corresponding to the provided operating mode signal;

providing the selected operating mode from the operating mode memory to the processing device;

processing of further user data contained in the user data area of the field bus telegram for providing control commands to a device interface of the field bus module, wherein the operating mode signal contained in the user data determines the selection of the operating mode from the plurality of operating mode data sets, wherein each of the operating mode data sets is configured as a tested combination of a processing algorithm and at least one parameter for the processing algorithm, and wherein the processing device carries out the processing of further user data from the field bus telegram with the aid of the processing algorithm determined by the operating mode, with the incorporation of the at least one parameter, and wherein the operating mode depends on the actuator that is connected to the device interface, and wherein the processing device is further configured for selecting an operating mode signal from a user data area of the field bus telegram, and wherein at least one of the operating mode memory and the processing device includes a logic gate for making available an operating mode data set from the operating mode memory to the processing device and for enabling a processing procedure by the processing device depending on the operating mode signal contained in the field bus telegram, the logic gate being configured to maintain the release of the operating mode to the processing device over a predetermined duration and to terminate processing of the user data and the sensor data after expiry of the predetermined duration.

11. A method for the parameterisation of a field bus module that is connected via a field bus system to a master control unit, which includes a control device, the method comprising the steps:

providing a field bus telegram from the control device via the field bus system to the field bus module;

processing of the field bus telegram in a processing device of the field bus module in order to select user data from a user data area of the field bus telegram;

providing an operating mode signal contained in the user data to an operating mode memory associated with the processing unit, in which a plurality of operating mode data sets for the processing device are stored;

selection of an operating mode corresponding to the provided operating mode signal;

providing the selected operating mode from the operating mode memory to the processing device;

processing of further user data contained in the user data area of the field bus telegram for providing control commands to an actuator connected to a device interface of the field bus module;

processing of sensor data provided by a sensor connected to the device interface to produce a field bus telegram for onward transmission to a field bus interface of the field bus module, wherein the operating mode signal contained in the user data determines the selection of the operating mode from the plurality of operating mode data sets, wherein each of the operating mode data sets is configured as a tested combination of a processing algorithm and at least one parameter for the processing algorithm, and wherein the processing device carries out the processing of the further user data from the field bus telegram and of the sensor data with the aid of the processing algorithm determined by the operating mode, with the incorporation of the at least one parameter, and wherein the operating mode depends on at least one of the sensor that is connected to the device interface or the actuator that is connected to the device interface, and wherein the processing device is further configured for selecting an operating mode signal from a user data area of the field bus telegram, and wherein at least one of the operating mode memory and the processing device includes a logic gate for making available an operating mode data set from the operating mode memory to the processing device and for enabling a processing procedure by the processing device depending on the operating mode signal contained in the field bus telegram, the logic gate being configured to maintain the release of the operating mode to the processing device over a predetermined duration and to terminate processing of the user data and the sensor data after expiry of the predetermined duration.

* * * * *